United States Patent
Tong et al.

(10) Patent No.: US 8,995,541 B2
(45) Date of Patent: Mar. 31, 2015

(54) METHOD, MOBILE TERMINAL, BASE STATION, AND SYSTEM FOR REPORTING BEST COMPANION PRECODING MATRIX INDEX IN COMMUNICATION SYSTEM WITH DOUBLE CODEBOOK

(75) Inventors: Hui Tong, Beijing (CN); Ming Xu, Beijing (CN); Masayuki Hoshino, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 24 days.

(21) Appl. No.: 13/883,155

(22) PCT Filed: Nov. 5, 2010

(86) PCT No.: PCT/CN2010/078473
§ 371 (c)(1),
(2), (4) Date: May 17, 2013

(87) PCT Pub. No.: WO2012/058825
PCT Pub. Date: May 10, 2012

(65) Prior Publication Data
US 2013/0223549 A1  Aug. 29, 2013

(51) Int. Cl.
*H04L 27/28* (2006.01)
*H04B 7/04* (2006.01)
*H04B 7/06* (2006.01)

(52) U.S. Cl.
CPC ............ *H04B 7/0456* (2013.01); *H04B 7/0478* (2013.01); *H04B 7/0639* (2013.01)
USPC .......................................... 375/260; 375/220

(58) Field of Classification Search
CPC ..................... H04L 25/0266; H04L 25/03343; H04L 27/2647; H04L 27/368; H04L 7/033; H04L 1/243; H04L 1/0001; H04L 1/0003; H04L 1/0071; H04L 5/0007; H04B 3/32; H03F 1/3247
USPC .................. 375/220–221, 260, 285, 295–296
See application file for complete search history.

(56) References Cited

U.S. PATENT DOCUMENTS

2010/0273499 A1* 10/2010 van Rensburg et al. ...... 455/450
2010/0273514 A1 10/2010 Koo et al.
(Continued)

FOREIGN PATENT DOCUMENTS

| CN | 101771505 A | 7/2010 |
|---|---|---|
| CN | 101826943 A | 9/2010 |
| CN | 101867458 A | 10/2010 |
| JP | 2013-528007 A | 7/2013 |

OTHER PUBLICATIONS

3GPP TSG RAN WG1 #56 Meeting,"Best Companion" reporting for improved single-cell MU-MIMO pairing, Alcatel-Lucent, Athens, Greece, Feb. 9-13, 2009.
(Continued)

*Primary Examiner* — Sam K Ahn
*Assistant Examiner* — Janice Tieu
(74) *Attorney, Agent, or Firm* — Pearne & Gordon LLP

(57) ABSTRACT

A method, mobile terminal, and system for reporting BCI are provided, the method comprises the steps of: obtaining a PMI W1 set and a PMI W2 to be used for a mobile terminal based on a double codebook; computing a BCI W1 set to be used for another mobile terminal based on the PMI W1 set; selecting a BCI W2 from the BCI W1 set based on the PMI W2; and reporting the BCI W1 set and the BCI W2 to a base station, wherein W1 indicates a long-term or wideband component of the PMI and BCI, and W2 indicates a short-term or narrowband component of the PMI and BCI. With the present disclosure, the probability that the optimal BCI W2 is included in the shifted BCI W1 set is increased, and the overhead for feeding-back the BCI is reduced.

24 Claims, 7 Drawing Sheets

(56) References Cited

U.S. PATENT DOCUMENTS

| | | |
|---|---|---|
| 2011/0170427 A1* | 7/2011 | Koivisto et al. ............... 370/252 |
| 2012/0063500 A1* | 3/2012 | Wang et al. ................... 375/224 |
| 2012/0106470 A1* | 5/2012 | Clerckx et al. ................ 370/329 |
| 2013/0028215 A1 | 1/2013 | Gerlach et al. |

OTHER PUBLICATIONS

3GPP TSG RAN WG1 #60, PMI-based Multi-Granular Feedback for SU/MU-MIMO Operation, Ericsson, ST-Ericsson, San Francisco, USA, Feb. 22-26, 2010.

Panasonic, Double codebook Signalling in Rel-10, 3GPP TSG RAN WG1 Meeting #62, Aug. 27, 2010.

Alcate-Lucent et al. Way Forward on CQI/PMI reporting enhancement on PUSCH 3-1 or 2.4 and 8 TX, 3GPP TSG RAN WG1 62bis, Oct. 15, 2010.

Panasonic, Double Codebook PUCCH Reporting in Rel-10, 3GPP TSG RAN WG1 Meeting #62, Oct. 15, 2010.

Best companion CQI for MU-MIMO enhancements, 3GPP TSG RAN WG1 Meeting #61, May 14, 2010.

International Search Report for Application No. PCT/CN2010/078473 dated Aug. 18, 2011.

* cited by examiner

PRIOR ART

PRIOR ART

PMI: | | W1 | W2 | | | | | W2 | | | | W2 | | | |

BCI: | | BCI (W1) | | | | | | | | | | | | | |

Fig. 5

PMI: | | W1 | W2 | | | | W2 | | | | W2 | | |

BCI: | | BCI (W1) | BCI (W2) | | | | BCI (W2) | | | | BCI (W2) | | |

Fig. 6

METHOD, MOBILE TERMINAL, BASE STATION, AND SYSTEM FOR REPORTING BEST COMPANION PRECODING MATRIX INDEX IN COMMUNICATION SYSTEM WITH DOUBLE CODEBOOK

TECHNICAL FIELD

The present disclosure is related to Multiple-Input-Multiple-Output (MIMO)/beam-forming technology in a multi-user communication system.

BACKGROUND

Multi-User (MU)-MIMO is an important means to increase peak data rate and spectral efficiency in the current wireless communication. To facilitate MU-MIMO operation, advanced feedback schemes are being considered in 4G wireless standards, such as LTE-A. One of those advanced feedback schemes is BCI (best companion PMI (pre-coding matrix index)) reporting.

In LTE Rel-8, PMI is adopted for Single-User (SU)-MIMO, i.e., the UE reports the most preferred pre-coding matrix to be used for the UE itself. PMI reporting is useful. Further, with BCI reporting, the UE also reports the most preferred pre-coding matrix to be used for the possibly co-scheduled UE.

FIG. 1 shows a schematic diagram that the UE feedbacks to a base station the most preferred PMI to be used for itself and the most preferred BCI to be used for possibly co-scheduled UE. As shown in the FIG. 1, a wireless communication system 100 may comprise a mobile terminal (UE) 101 and a base station 103, in which the mobile terminal 101 reports to the base station 103 the most preferred PMI to be used for itself and the most preferred BCI to be used for a possibly co-scheduled UE (another mobile terminal) 102. Similar to the PMI/CQI reporting pair, BCI reporting can be accompanied by a delta CQI, which indicates the CQI degradation due to the co-scheduled UE that adopts the reported BCI as its PMI.

In the LTE-advanced standardization, a double codebook structure for the PMI reporting of 8Tx antenna (eNB-base station) is agreed. The rank one pro-coding vector of the double codebook is in the form of $[v_i^T k \cdot v_i^T]^T$, where $i \in \{0, 1, 2, \ldots 31\}$, and $k \in \{1, -1, j, -j\}$. The vector $v_i$ is a 4×1 column vector, which can be expressed as:

$$v_i = \begin{bmatrix} 1 \\ \exp\left(j\frac{i \cdot 2\pi}{32}\right) \\ \exp\left(j\frac{2 \cdot i \cdot 2\pi}{32}\right) \\ \exp\left(j\frac{3 \cdot i \cdot 2\pi}{32}\right) \end{bmatrix},$$

where j denotes the imaginary unit.

FIG. 2 shows a diagram of the agreed double codebook structure of the rank one used for the PMI reporting of 8Tx antenna. It is seen that the rank one codebook represents the combination of DFT (Discrete Fourier Transform) beam (component) and co-phasing factors. However, the reporting of DFT beam index and co-phasing factors is not to simply report the above two things. Instead, a two-level report corresponding to the double codebook is adopted: the UE firstly feedbacks a rough knowledge of PMI (a long-term/wideband component, W1), which indicates to the base station that possible pre-coding vectors are in a DFT direction $\{0, 1, 2, 3\}$ when W1=0, and the co-phasing factors can be $\{1, -1, j, -j\}$. W1 is a four-bit signal because there is overlapping of the possible pre-coding vectors between $\{W1=0\}$ and $\{W1=1\}$. After W1 is reported, the UE further reports another more accurate knowledge of PMI (a short-term/narrowband component, W2), which indicates to the base station that the exact pre-coding vector is in the set confined by W1. In the FIG. 2, the possible DFT beam indexes in case of W1=0 is from v0 to v3, the possible DFT beam indexes in case of W1=1 is from v2 to v5, the possible pre-coding vectors when W1=2 is from v4 to v7, ..., the possible DFT beam indexes in case of W1=14 is from v28 to v31, and the possible DFT bean indexes in case of W1=15 includes v30, v31, V0, and V1.

The advantage of the double codebook is to better exploit the continuity of the pre-coding vectors in the time/frequency domain, so either the overhead can be improved comparing with a 7-bit single codebook design without significant loss of reporting accuracy.

An important feature of the agreed double codebook is that the adjacent DFT beams (in terms of index) are also adjacent in terms of their directionality.

FIG. 3 shows a diagram of the directionality of the DFT beams.

As shown in the FIG. 3, when w1=0, the adjacent DFT beams v0, v1, v2, v3 are also adjacent in their directionality.

Because the BCI is calculated based on the PMI assumption, how to report the BCI in conjunction with the double codebook based PMI is a problem.

SUMMARY OF THE DISCLOSURE

In one aspect of the present disclosure, a method of reporting BCI in a wireless communication system is provided, the method comprises the steps of: obtaining a PMI W1 set and a PMI W2 to be used for a mobile terminal based on a double codebook; computing a BCI W1 set to be used for another mobile terminal based on the PMI W1 set; and reporting the BCI W1 set to a base station, wherein W1 indicates a long-term or wideband component of the PMI and BCI, and W2 indicates a short-term or narrowband component of the PMI and BCI.

In the above aspect, the BCI W1 set is reported on a relatively long interval.

In the above aspect, the method of reporting BCI further comprises steps of: selecting a BCI W2 from the BCI W1 set based on the PMI W2, and reporting the BCI W2 to the base station.

In the above aspect, the BCI W1 set is reported on a relatively long interval, BCI W2 is reported on a relatively short interval.

In the above aspect, the BCI W1 set and the BCI W2 are reported both on relatively short interval.

In the above aspect, the method further comprises a step of shifting the BCI W1 set based on the PMI W2.

In the above aspect, the BCI W1 set is reported on a long time interval, the BCI W2 is reported on a short time interval.

In the above aspect, the double codebook is a combination of DFT components and co-phasing factors, the DFT components are represented by a plurality of columns of vectors, and the co-phasing factors are represented by [1, -1, j, -j].

In the above aspect, the method further comprises a step of: if the PMI W2 is located on the left side column of the PMI W1 set, shifting the BCI W1 set to its left side, and if the PMI W2 is located on the right side column of the PMI W1 set, shifting the BCI W1 set to its right side.

In the above aspect, the method further comprises a step of shifting the BCI W1 set by one or two columns of the vectors.

In the above aspect, the method further comprises a step of confining the co-phasing factors of the BCI W1 set, wherein, if the PMI W2 has co-phasing factors within [1, −1], the co-phasing factors of the BCI W1 set are confined to [1, −1], and if the PMI W2 has co-phasing factors within [j, −j], the co-phasing factors of the BCI W1 set are confined to [j, −j]. In the above aspect, the BCI W2 is orthogonal to the PMI W2.

In another aspect of the present disclosure, a mobile terminal for reporting BCI to a base station in a wireless communication system is provided, the mobile terminal comprises: an obtaining unit which obtains a PMI W1 set and a PMI W2 based on a double codebook; a computation unit which computes a BCI W1 set to be used for another mobile terminal based on the PMI W1 set; and a reporting unit which reports the BCI W1 set to the base station, wherein, W1 indicates a long-term or wideband component of the PMI and BCI, and W2 indicates a short-term or narrowband component of the PMI and BCI.

In the above another aspect, the BCI W1 set is reported on a relatively long interval.

In the above another aspect, the mobile terminal further comprises a selection unit which selects a BCI W2 from the BCI W1 set based on the PMI W2. The reporting unit reports the BCI W2 to the base station.

In the above another aspect, the BCI W1 set is reported on a relatively long interval, and BCI W2 is reported on a relatively short interval.

In the above another aspect, the BCI W1 set and the BCI W2 are reported both on relatively short interval.

In the above another aspect, the mobile terminal further comprises a shifting unit which shifts the BCI W1 set based on the PMI W2. The shifting unit shifts the BCI W1 set to its left side if the PMI W2 is located on the left side column of the PMI W1 set, and shifts the BCI W1 set to its right side if the PMI W2 is located on the right side column of the PMI W1 set. The shifting unit shifts the BCI W1 set by one or two columns of the vectors. The shifting unit further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit confines the co-phasing factors of the BCI W1 set to [j, −j]. The BCI W2 selected from the BCI W1 set is orthogonal to the PMI W2.

In a further aspect of the present disclosure, a base station for receiving BCI (best companion PMI (pre-coding matrix index)) from a mobile terminal in a wireless communication system is provided, which comprises: a receiving unit which receives a PMI W1 set, a PMI W2, and a BCI W1 set from the mobile terminal, which are generated based on a double codebook; and a pre-coding unit which pre-codes data to be sent to another mobile terminal with the BCI W1 set, wherein, W1 indicates a long-term or wideband component of the PMI and BCI, and W2 indicates a short-term or narrowband component of the PMI and BCI.

In the above further aspect, the receiving unit further receives a BCI W2 from the mobile terminal, wherein the BCI W1 set is shifted by the mobile terminal based on the PMI W2, and the BCI W2 is selected by the mobile terminal from the shifted BCI W1 set based on the PMI W2.

In the above further aspect, the BCI W1 set is received on a relatively long interval, and BCI W2 is received on a relatively short interval.

In the above further aspect, the base station further comprises a shifting unit which shifts the BCI W1 set based on the received PMI W2. The shifting unit shifts the BCI W1 set to its left side if the PMI W2 is located on the left side column of the PMI W1 set, and shifts the BCI W1 set to its right side if the PMI W2 is located on the right side column of the PMI W1 set. The shifting unit shifts the BCI W1 set by one or two columns of the vectors. The shifting unit further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit confines the co-phasing factors of the BCI W1 set to [j, −j]. The BCI W2 selected from the BCI W1 set is orthogonal to the PMI W2.

In another further aspect of the present disclosure, a wireless communication system for reporting BCI from a mobile terminal to a base station is provided, wherein the mobile terminal comprises: an obtaining unit which obtains a PMI W1 set and a PMI W2 based on a double codebook; a computation unit which computes a BCI W1 set to be used for another mobile terminal based on the PMI W1 set; a selection unit which selects a BCI W2 from the BCI W1 set based on the PMI W2; and a reporting unit which reports the BCI W1 set and the BCI W2 to the base station, wherein, W1 indicates a long-term or wideband component of the PMI and BCI, and W2 indicates a short-term or narrowband component of the PMI and BCI. The said base station comprises: a receiving unit which receives a PMI W1 set, a PMI W2, a BCI W1 set and a BCI W2 from the mobile terminal, which are generated based on a double codebook; and a pre-coding unit which pre-codes data to be sent to another mobile terminal with the BCI W1 set, wherein, W1 indicates a long-term or wideband component of the PMI and BCI, and W2 indicates a short-term or narrowband component of the PMI and BCI.

In the above other further aspect, the mobile terminal in the wireless communication system further comprises a shifting unit which shifts the BCI W1 set based on the PMI W2. The shifting unit shifts the BCI W1 set to its left side if the PMI W2 is located on the left side column of the PMI W1 set, and shifts the BCI W1 set to its right side if the PMI W2 is located on the right side column of the PMI W1 set. The shifting unit shifts the BCI W1 set by one or two columns of the vectors. The shifting unit further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit confines the co-phasing factors of the BCI W1 set to [j, −j]. The BCI W2 selected from the BCI W1 set is orthogonal to the PMI W2.

In the above other further aspect, the base station in the wireless communication system further comprises a shifting unit which shifts the BCI W1 set based on the received PMI W2. The shifting unit shifts the BCI W1 set to its left side if the PMI W2 is located on the left side column of the PMI W1 set, and shifts the BCI W1 set to its right side if the PMI W2 is located on the right side column of the PMI W1 set. The shifting unit shifts the BCI W1 set by one or two columns of the vectors. The shifting unit further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit confines the co-phasing factors of the BCI W1 set to [j, −j]. The BCI W2 selected from the BCI W1 set is orthogonal to the PMI W2.

With the method, mobile terminal, and wireless communication system of the present disclosure, the probability that the optimal BCI W2 is included in the shifted BCI W1 set is increased, and the overhead for feeding-back the BCI is reduced.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 shows a schematic diagram of the operations of the mobile terminal for reporting the BCI according to one embodiment of the present disclosure.

FIG. 6 shows a schematic diagram of the operations of the mobile terminal for reporting the BCI based on the double codebook according to another embodiment of the present disclosure.

DETAILED DESCRIPTION

Figure 1:
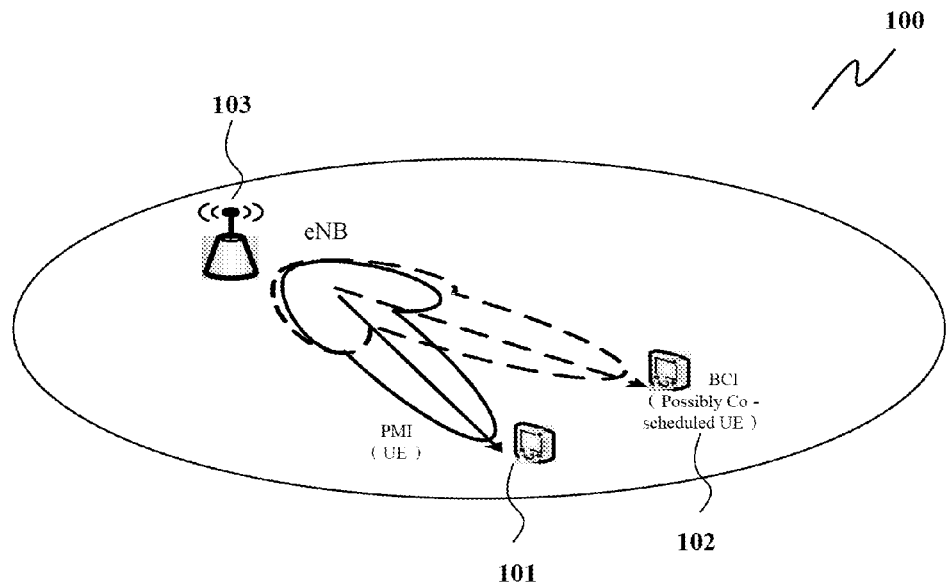
FIG. 1 shows a schematic diagram that UE feedbacks to a base station the most preferred PMI to be used for itself and the most preferred PCI to be used for a possibly co-scheduled UE.
Figure 2:
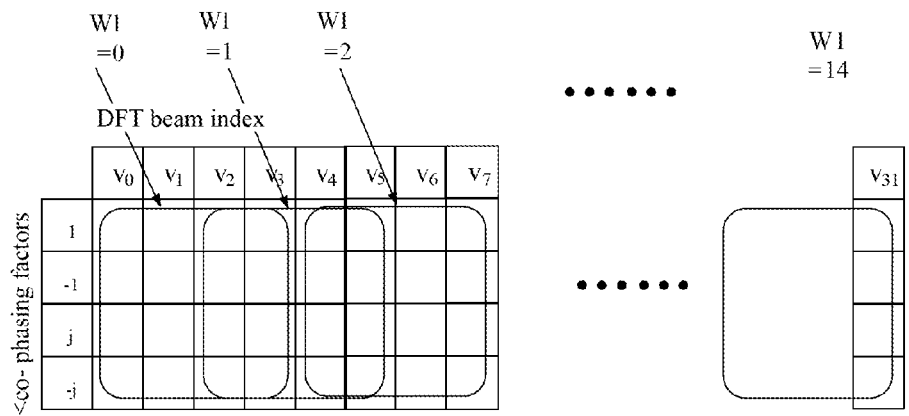
FIG. 2 shows a diagram of the double codebook structure with rank one used for the PMI reporting of 8Tx antenna.
Figure 3:
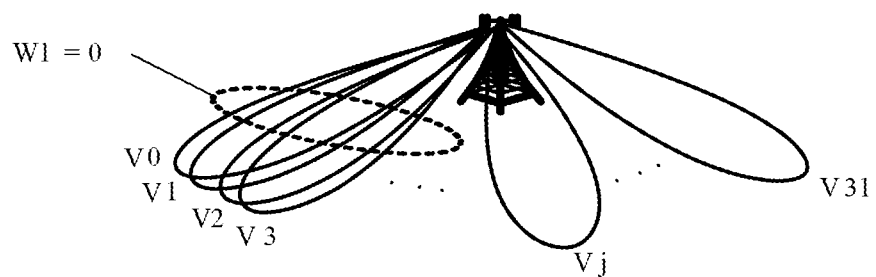
FIG. 3 shows a schematic diagram of the directionality of the DFT beams.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The disclosure is drawn, inter alia, to methods, mobile terminals, base stations, and wireless communication systems for reporting the BCI.

Figure 4:
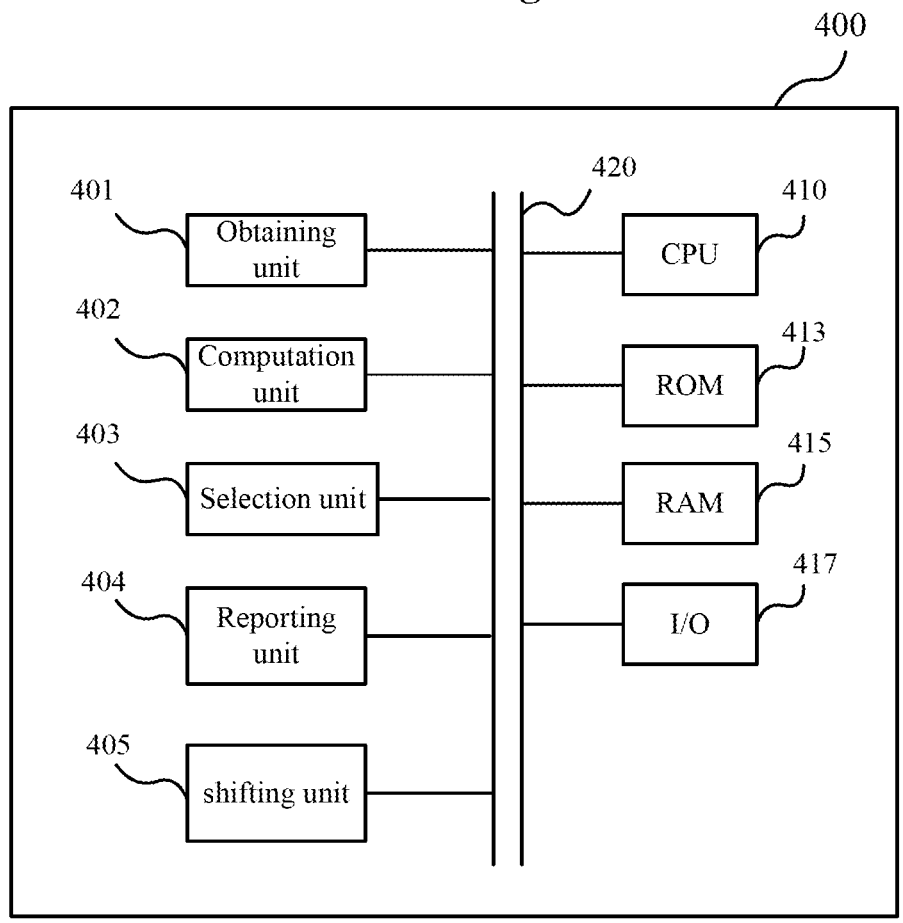
FIG. 4 shows a block diagram of a mobile terminal for reporting the BCI according to one embodiment of the present disclosure.

FIG. 4 shows a block diagram of a mobile terminal for reporting the BCI according to one embodiment of the present disclosure.

As shown in the FIG. 4, the mobile terminal 400 according to one embodiment of the present disclosure may comprise: an obtaining unit 401, a computation unit 402, and a reporting unit 404 which are connected with each other.

According to another embodiment of the present disclosure, the mobile terminal 400 may further comprise a selection unit 403 and/or a shifting unit 405.

The mobile terminal 400 according to one embodiment of the present disclosure may further comprise: a central process unit (CPU) 410 which is used to execute relevant programs to process various kinds of data, and to control the operations of each unit included in the mobile terminal 400; a read only memory (ROM) 413 which is used to store various programs required for the CPU 410 to execute various operations and controls; a random access memory (RAM) 415 which is used to store various data produced in the procedure of the CPU 410 executing operations and controls; an input/output unit (I/O) 417 which is used to connect with external devices, and transmit various data between the external devices and the mobile terminal 400, etc. The above obtaining unit 401, computation unit 402, selection unit 403, reporting unit 404, shifting unit 405, CPU 410, ROM 413, RAM 415, and I/O unit 417 may be connected with each other via a data/command bus 420, and transmit signals with each other.

The above units do not limit the scope of the present disclosure. According to one embodiment of the present disclosure, the functions of the obtaining unit 401, computation unit 402, selection unit 403, reporting unit 404, and shifting unit 405 can be realized by software in combination with the CPU 410, ROM 413, RAM 415, and I/O unit 417. Further, the obtaining unit 401, computation unit 402, selection unit 403, reporting unit 404, and shifting unit 405 can be realized by combining into one unit.

According to one embodiment of the present disclosure, the above units of the mobile terminal 400 for reporting BCI to a base station in a wireless communication system are operated as: the obtaining unit 401 obtains a PMI W1 set and a PMI W2 based on a double codebook, the computation unit 402 computes a BCI W1 set to be used for another mobile terminal based on the PMI W1 set, and the reporting unit 404 reports the BCI W1 set to the base station, wherein, W1 indicates a long-term or wideband component of the PMI and BCI, and W2 indicates a short-term or narrowband component of the PMI and BCI. Here, the other mobile terminal is possibly co-scheduled with the mobile terminal 400 in the wireless communication system.

FIG. 5 shows a schematic diagram of the operations of the mobile terminal for reporting the BCI according to one embodiment of the present disclosure.

As shown in the FIG. 5, when the PMI W1 set is generated and reported in a sub-frame (the uplink control channel) or in a report (the uplink data channel), a corresponding BCI W1 set is calculated based on the generated PMI W1 set, and the generated BCI W1 set is reported to the base station with a sub-frame or with a report too. The BCI W1 set is reported to the base station on a relatively long interval.

FIG. 6 shows a schematic diagram of the operations of the mobile terminal for reporting the BCI based on the double codebook according to another embodiment of the present disclosure.

According to the present embodiment, the mobile terminal 400 for reporting the BCI based on the double codebook reuses the double codebook structure. In other words, the BCI reporting is based on the double codebook structure as well, where the BCI W1 set is calculated based on the PMI W1 set, and the BCI W2 is selected from the BCI W1 set based on the PMI W2.

As shown in the FIG. 6, when the PMI W1 set is generated and reported in a sub-frame (the uplink control channel) or in a report (the uplink data channel), a corresponding BCI W1 set is calculated based on the generated PMI W1 set, and the generated BCI W1 set is reported to the base station with a sub-frame or with a report too. In the subsequent sub-frame or report, the PMI W2 is generated and reported to the base station. The selection unit 403 of the mobile terminal 400 selects a corresponding BCI W2 from the BCI W1 set based on the generated PMI W2, and the reporting unit 404 reports the generated BCI W2 to the base station. According to the present embodiment, the reporting unit 404 reports the BCI W1 set to the base station on a relatively long interval, and reports the BCI W2 to the base station on a relatively short interval. According to the present embodiment, the BCI W1 set is reported to the base station on a relatively long interval, and BCI W2 is reported to the base station on a relatively short interval.

Figures 7, 8:
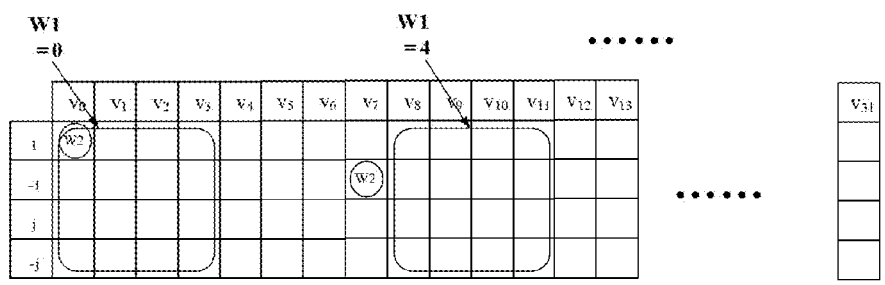
FIG. 7 shows a schematic diagram of the operations of the mobile terminal for reporting the BCI according to a further embodiment of the present disclosure.
FIG. 8 shows an example of the double codebook BCI calculation according to one embodiment of the present disclosure.

FIG. 7 shows a schematic diagram of the operations of the mobile terminal for reporting the BCI according to a further embodiment of the present disclosure.

As shown in the FIG. 7, the PMI W1 set is generated and reported in a sub-frame (the uplink control channel) or in a report (the uplink data channel). In the subsequent sub-frame or report, the PMI W2 is generated and reported to the base station. A corresponding BCI W1 set is calculated based on the generated PMI W1 set, and the selection unit 403 of the mobile terminal 400 selects a corresponding BCI W2 from the BCI W1 set based on the generated PMI W2, and the reporting unit 404 reports both the generated BCI W1 set and the BCI W2 to the base station. According to the present embodiment, the reporting unit 404 reports the BCI W1 set and the BCI W2 to the base station both on a relatively short interval.

Hereinafter, more detailed analysis of BCI calculation process based on the double codebook will be provided.

FIG. 8 shows an example of BCI calculation the double codebook according to one embodiment of the present disclosure.

As shown in the FIG. 8, the double codebook is a combination of DFT components and co-phasing factors, the DFT components are represented by a plurality of columns of vectors "v0, v1, v2, v3, . . . v31", and co-phasing factors are represented by [1, −1, j, −j]. The resultant precoding vector corresponds to the form $[v1^T -v1^T]^T$, if reported DFT beam and co-phasing factors are v1 and −1, respectively, where T denotes vector transpose. The person skilled in the art should be able to generalize the above example to any combination of DFT component and co-phasing factors without any difficulty.

Similar to the PMI calculation process, the double codebook BCI calculation is a two stage process. Specifically, in the first stage, given that the reported PMI W1 is 0, which is in the direction {0, 1, 2, 3} with co-phasing factors {1, −1, j, −j}, and the BCI W1 set is calculated to be, for example, 4. An important observation is that BCI W1 set is calculated based on the "average" of the multiple possible PMI W2s in the set W1=0. However, it is noted that the BCI W1 set calculated based on the PMI W1 set is rough information of the PMI, so the BCI W1 set is not optimal.

In the second stage, the short-term/narrowband BCI (W2) is selected from the BCI W1 set based on the knowledge of PMI W2. It should be noted that the BCI W2 reported to the base station is selected from the BCI W1 set based on the PMI W2, i.e., the possible BCI W2 are in the direction {8, 9, 10, 11} with co-phasing factors {1, −1, j, −j}. In other words, the reported BCI W2 is searched for inside the BCI W1 set.

For example, in the FIG. 8, given that the PMI W2 corresponds to the direction {0} and co-phasing factor {1}, which is on the left side of the "average" of the pre-coding vectors of the PMI W1 set (W1=0). Because the BCI W1 set is calculated based on the "average" of the pre-coding vectors of the PMI W1 set, and an optimal BCI W2 may be calculated based on the PMI W2, possibly the optimal BCI W2 may not be in the BCI W1 set. Therefore, the BCI W2 selected from the BCI W1 set and reported to the base station sometimes is not the optimal BCI W2, and causes performance degradation.

Figure 9:
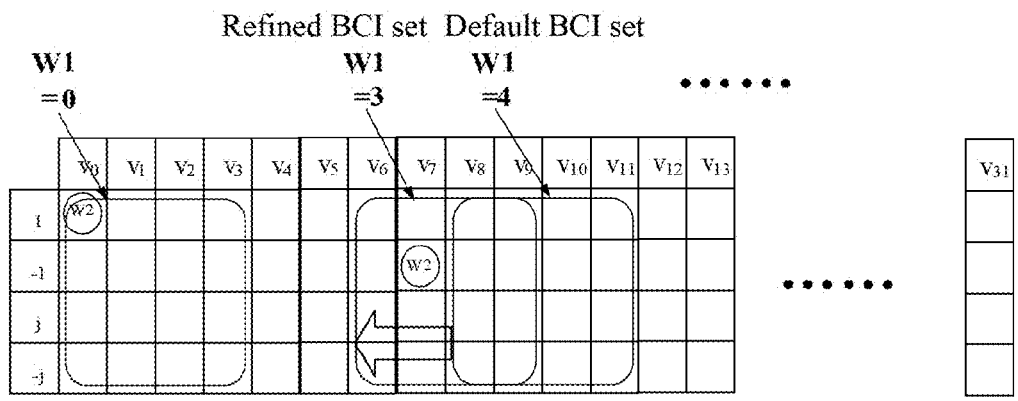
FIG. 9 shows an example of shifting the BCI W1 set in the BCI calculation according to one embodiment of the present disclosure.

FIG. 9 shows an example of shifting the BCI W1 set in the BCI calculation according to one embodiment of the present disclosure.

To resolve the above problem of possibly the optimal BCI W2 being not within the BCI W1 set, the present disclosure proposes to shift the BCI W1 set based on the PMI W2. Therefore, according to one embodiment of the present disclosure, the mobile terminal 400 further comprises a shifting unit 405 which shifts the BCI W1 set based on the PMI W2. For example, if the PMI W2 is on the left side column of the vectors of the PMI W1 set, the shifting unit 405 shifts the BCI W1 set to its left side. Similarly, if the PMI W2 is on the right side column of the vectors of the PMI W1 set, the shifting unit 405 shifts the BCI W1 set to its right side. As shown in the FIG. 9, after the shifting operation, the BCI W1 set indicated as W1=3 may be used as the shifted BCI W1 set indicated as W1=4, though the current BCI W1 set corresponds to W1=4.

As shown in the FIG. 9, given that the PMI W1 set is W1=0, and the BCI W1 set is calculated to be W1=4, and further given that the actual PMI W2 corresponds to the direction {0} and co-phasing factor {1}, which is located on the upper-left side of the PMI W1 set indicated as W1=0, then the optimal BCI W2 is calculated based on the actual PMI W2 to correspond to the direction {7} and co-phasing factor {−1}. In this connection, the calculated optimal BCI W2 is not located within the calculated BCI W1 set indicated as W1=4, so the BCI W2 selected from the BCI W1 set indicated as W1=4 and reported to the base station will not be the optimal BCI W2. However, according to the embodiment as shown in the FIG. 9, since the actual PMI W2 is located on the left side of the averaged PMI W1 set indicated as W1=0, the BCI W1 set indicated as W1=4 is shifted to its left side to obtain the shifted BCI W1 set, which is indicated as W1=3. After the shifting operation, the optimal BCI W2 corresponding to the direction {7} and co-phasing factor {−1} is located within the shifted BCI W1 set indicated as W1=3, so the optimal BCI W2 can be selected from the shifted BCI W1 set indicated as W1=3, and reported to the base station.

According to one embodiment of the present disclosure, the BCI W1 set may be shifted by one or two columns of the vectors. For example, similar to the FIG. 9, it is possible to shift just one column to the left side if the PMI W2 is on the left side of the averaged PMI W1 set. In this case, the shifted BCI W1 set does not correspond to any PMI W1 set, but it takes a better tradeoff between the actual PMI W2 and the averaged PMI W1 set than the two columns shifting.

Figure 10:
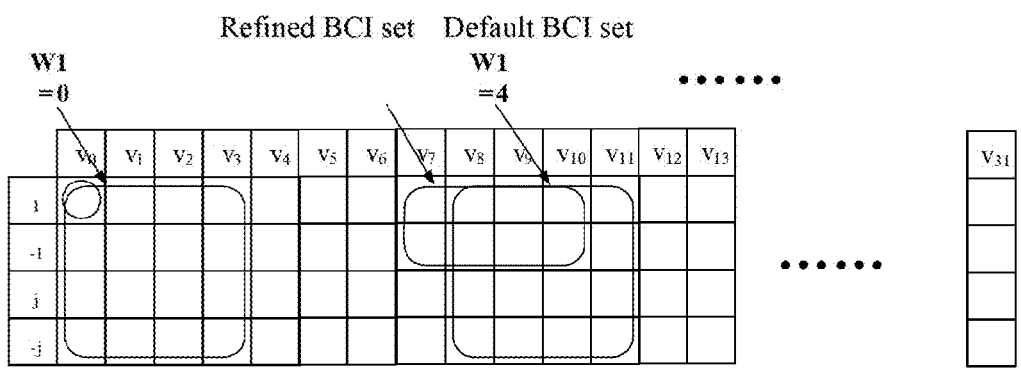
FIG. 10 shows an example of shifting the BCI W1 set and considering the co-phasing factors in the BCI calculation according to a further embodiment of the present disclosure.

FIG. 10 shows an example of shifting the BCI W1 set by considering the co-phasing factors in the BCI calculation according to a further embodiment of the present disclosure.

According to a further embodiment of the present disclosure, it is possible to further confine the BCI co-phasing factors according to the actual PMI W2 value. For example, the shifting unit 405 may further confine the co-phasing factors of the BCI W1 set, wherein if the PMI W2 has co-phasing factors within [1, −1], the shifting unit 405 confines the co-phasing factors of the BCI W1 set to [1, −1], and if the PMI W2 has co-phasing factors within [j, −j], the shifting unit 405 confines the co-phasing factors of the BCI W1 set to [j, −j].

Specifically, as shown in the FIG. 10, given that the PMI W1 set is W1=0, and the BCI W1 set is calculated to be W1=4, and further given that the actual PMI W2 corresponds to the direction {0} and co-phasing factor {1}, which is located on the upper-left side of the PMI W1 set (W1=0). Since the actual PMI W2 is located on the left side of the averaged PMI W1 set (W1=0), so the BCI W1 set (W1=4) is shifted to its left side by one column or two columns to obtain the shifted BCI W1 set. According to the present embodiment, since the actual PMI W2 is located on the upper side of the PMI W1 set (W1=0), i.e., the actual PMI W2 has co-phasing factor within [1, −1], the shifted BCI W1 set is more restricted by confining the co-phasing factors to [1, −1]. Similarly, if the actual PMI W2 is located on the lower side of the PMI W1 set (W1=0), i.e., the actual PMI W2 has co-phasing factors within [j, j], the shifted BCI W1 set is more restricted by confining the co-phasing factors to [j, j]. In such a case, not only the possibility of including the optimal BCI W2 in the shifted BCI W1 set is increased, but also the overhead for feeding-back the BCI W2 is reduced, e.g., from 4 bits to 3 bits.

In another embodiment, the BCI W2 may be selected from the BCI W1 set so that the BCI W2 is orthogonal to the PMI W2. For example, If PMI W1 set is determined as W1=0, then the possible BCI W1 set are calculated as W1=4, or 8, or 12. In this case, If PMI W2 is determined as having vector of v0 and co-phasing factor of [1], the BCI W1 set is shifted to its left side by one column. At this time, if the BCI W2 is selected as orthogonal to the PMI W2, the overhead for reporting the BCI W1 set will be reduced to 2 bits (original 4 bits), and the overhead for reporting the BCI W2 will be reduced to 3 bits (original 4 bits).

According to one embodiment of the present disclosure, a shifting unit may not be installed in the base station side, and the schema of how to shift the BCI W1 set and confine the co-phasing factors is explicitly signaled from the mobile terminal to the base station. In such a way, the reporting unit at the mobile terminal not only reports PMI W1, PMI W2, BCI W1 set, and BCI W2, but also reports how the BCI W1 set is shifted/confined from the original BCI W1 set. Furthermore, when the reporting unit of the mobile terminal reports the BCI W1 set to the base station as well as the signaling indicating shifting/confining information, both of the base station and the mobile terminal will know how to shift the BCI W1 set and confine the co-phasing factors, so can select the BCI W2 from the shifted BCI W1 set with the same schema. However, according to another embodiment of the present disclosure, the shifting unit may be installed in the base station. In such a way, there is no explicit signaling from the mobile terminal to the base station to indicate how to shift/confine the BCI W1 set. Furthermore, when the mobile terminal reports the BCI W1 set to the base station, the shifting unit at the base station will derive the shifted/confined BCI W1 set based on the knowledge of PMI W2. In this case (shifting unit installed at the base station), in general, the shifting units in the mobile terminal and base station should maintain the same shifting/confining rules (i.e., same PMI W2 value should result the same shifting/confining in shifting units in both base station and mobile terminal). In both cases (base station shifting unit is installed or not), it is commonly understood between the mobile terminal and the base station that the reported BCI W2 is selected from the shifted/confined BCI W1 set but not the original BCI W1 set.

Figure 11:
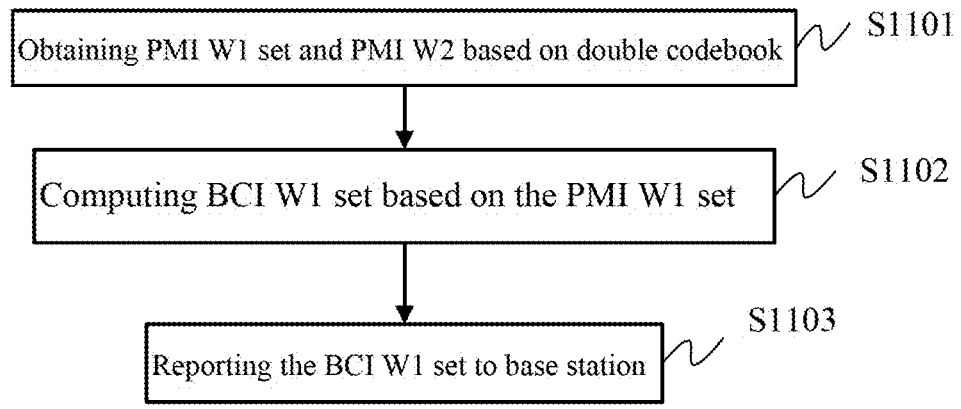
FIG. 11 shows a flow chart of a method of reporting the BCI in a wireless communication system according to one embodiment of the present disclosure.

FIG. 11 shows a flow chart of a method of reporting the BCI in a wireless communication system according to one embodiment of the present disclosure.

As shown in the FIG. 11, in the step S1101, a PMI W1 set and a PMI W2 to be used for a mobile terminal are obtained based on a double codebook. In the step S1102, a BCI W1 set to be used for another mobile terminal is calculated based on the PMI W1 set. In the step S1103, the BCI W1 set is reported to a base station. Here, W1 indicates a long-term or wideband component of the PMI and BCI, and W2 indicates a short-term or narrowband component of the PMI and BCI. The BCI W1 set may be reported to the base station on a relatively long interval.

According to one embodiment of the present disclosure, the above step S1101 can be executed by the obtaining unit 401, the above step S1102 can be executed by the computation unit 402, the above step S1103 can be executed by the reporting unit 404.

According to another embodiment of the present disclosure, the method of reporting BCI further comprises steps of selecting a BCI W2 from the BCI W1 set based on the PMI W2; and reporting the BCI W2 to the base station. The above steps can be executed by the selection unit 403 and the reporting unit 405, respectively. The BCI W1 set may be reported on a relatively long interval, and the BCI W2 may be reported on a relatively short interval. Alternatively, the BCI W1 set and the BCI W2 are reported both on relatively short interval.

Figure 12:
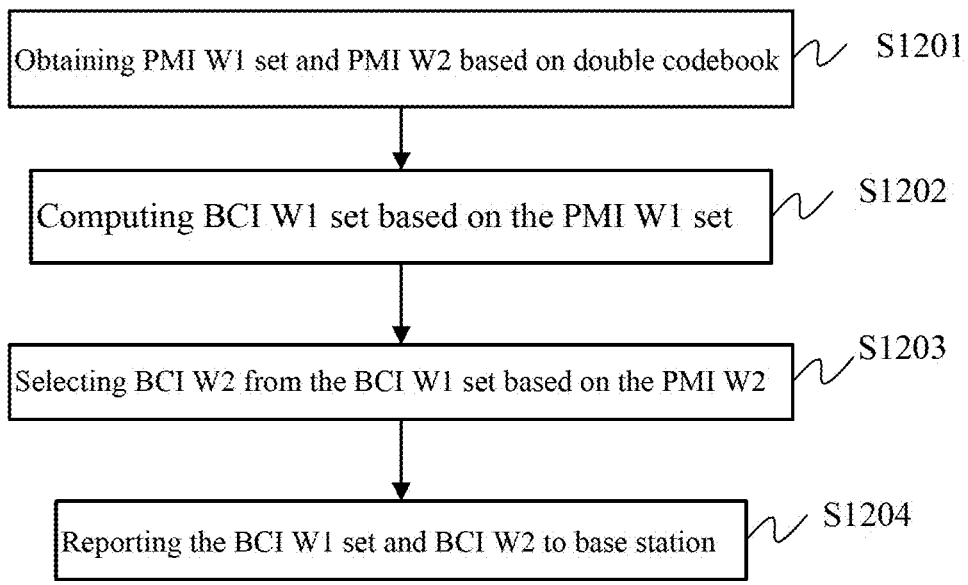
FIG. 12 shows a flow chart of a method of reporting the BCI in a wireless communication system according to another embodiment of the present disclosure.

FIG. 12 shows a flow chart of a method of reporting the BCI in a wireless communication system according to another embodiment of the present disclosure.

As shown in the FIG. 12, in the step S1201, a PMI W1 set and a PMI W2 to be used for a mobile terminal are obtained based on a double codebook. In the step S1202, a BCI W1 set to be used for another mobile terminal is calculated based on the PMI W1 set. In the step S1203, a BCI W2 is selected from the BCI W1 set based on the PMI W2. In the step S1204, the BCI W1 set and the BCI W2 are reported to a base station. Here, W1 indicates a long-term or wideband component of the PMI and BCI, and W2 indicates a short-term or narrowband component of the PMI and BCI.

According to one embodiment of the present disclosure, the above step S1201 can be executed by the obtaining unit 401, the above step S1202 can be executed by the computation unit 402, the above step S1203 can be executed by the selection unit 403, and the above step S1204 can be executed by the reporting unit 404.

According to another embodiment of the present disclosure, the method of reporting BCI further comprises a step of shifting the BCI W1 set based on the PMI W2. The above step can be executed by the shifting unit 405.

According to another embodiment of the present disclosure, the method of reporting BCI further comprises a step of reporting the BCI W1 set on a long time interval, and reporting the BCI W2 on a short time interval. The above step can be executed by the reporting unit 404.

According to another embodiment of the present disclosure, the double codebook is a combination of DFT components and co-phasing factors, the DFT components are represented by a plurality of columns of vectors, and the co-phasing factors are represented by [1, −1, j, −j].

According to another embodiment of the present disclosure, the method of reporting BCI further comprises steps of: if the PMI W2 is located on the left side column of the PMI W1 set, shifting the BCI W1 set to its left side, and if the PMI W2 is located on the right side column of the PMI W1 set, shifting the BCI W1 set to its right side. The above step can be executed by the shifting unit 405.

According to another embodiment of the present disclosure, the method of reporting BCI further comprises a step of: shifting the BCI W1 set by one or two columns of the vectors. The above step can be executed by the shifting unit 405.

According to another embodiment of the present disclosure, the method of reporting BCI further comprises a step of: confining the co-phasing factors of the BCI W1 set, wherein, if the PMI W2 has co-phasing factors within [1, −1], the co-phasing factors of the BCI W1 set is confined to [1, −1], and if the PMI W2 has co-phasing factors within [j, −j], the co-phasing factors of the BCI W1 set is confined to [j, −j]. The above step can be executed by the shifting unit 405.

According to another embodiment of the present disclosure, the BCI W2 selected from the shifted BCI W1 set, where the BCI W2 is constraint to be orthogonal to the PMI W2.

Figure 13:
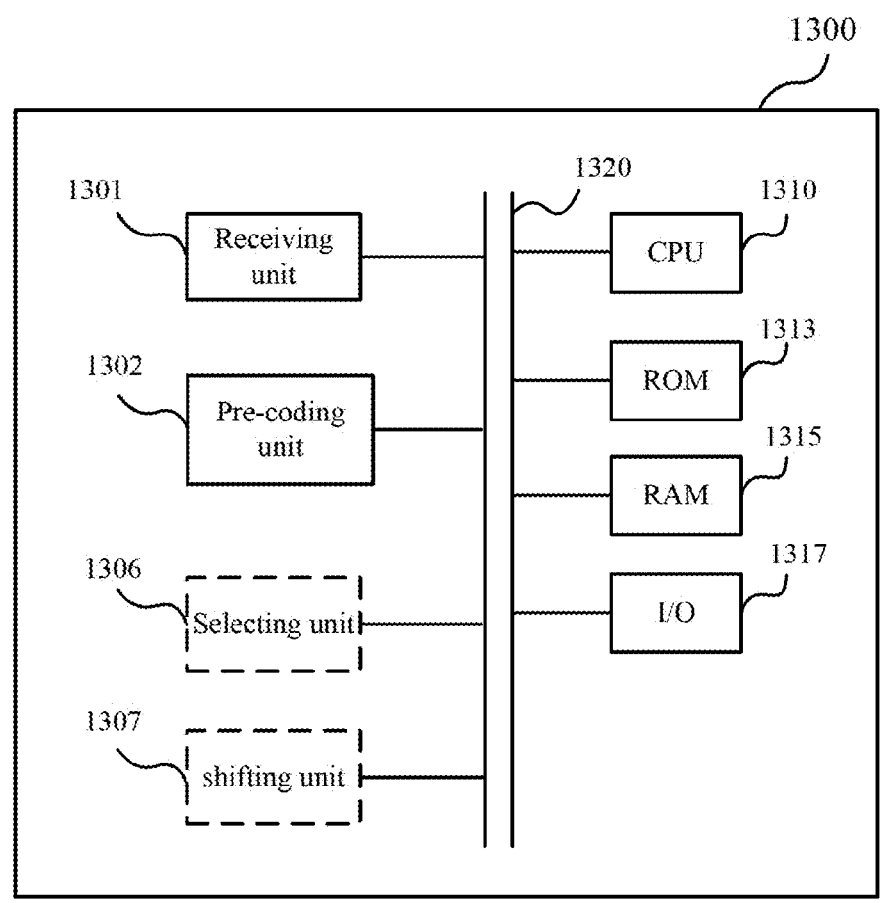
FIG. 13 shows a block diagram of a base station for receiving the BCI from a mobile terminal according to one embodiment of the present disclosure.

FIG. 13 shows a block diagram of a base station for receiving the BCI from a mobile terminal according to one embodiment of the present disclosure.

As shown in the FIG. 13, the base station 1300 according to one embodiment of the present disclosure may comprise: a receiving unit 1301 and a pre-coding unit 1302 which are connected with each other.

According to another embodiment of the present disclosure, the base station 1300 may further comprise a selection unit 1306 and/or a shifting unit 1307.

The base station 1300 according to one embodiment of the present disclosure may further comprise: a central process unit (CPU) 1310 which is used to execute relevant programs to process various kinds of data, and to control the operations of each unit included in the base station 1300; a read only memory (ROM) 1313 which is used to store various programs required for the CPU 1310 to execute various operations and controls; a random access memory (RAM) 1315 which is used to store various data produced in the procedure of the CPU 1310 executing operations and controls; an input/output unit (I/O) 1317 which is used to connect with external devices, and transmit various data between the external devices and the base station 1300, etc. The above receiving unit 1301, pre-coding unit 1302, selection unit 1306, shifting unit 1307, CPU 1310, ROM 1313, RAM 1315, and I/O unit 1317 may be connected with each other via a data/command bus 1320, and transmit signals with each other.

The above units do not limit the scope of the present disclosure. According to one embodiment of the present disclosure, the functions of the receiving unit 1301, pre-coding unit 1302, selection unit 1306, and shifting unit 1307 can be realized by software in combination with the CPU 1310, ROM 1313, RAM 1315, and I/O unit 1317. Further, the receiving unit 1301, pre-coding unit 1302, selection unit 1306, and shifting unit 1307 can be realized by combining into one unit.

According to one embodiment of the present disclosure, the above units of the base station 1300 for receiving BCI from a mobile station in a wireless communication system are operated as: the receiving unit 1301 receives a PMI W1 set, a PMI W2, and a BCI W1 set from the mobile terminal, wherein the PMI W1 set, PMI W2, and BCI W1 set are generated based on a double codebook; the pre-coding unit 1302 pre-codes data to be sent to another mobile terminal with the BCI W1 set, wherein, W1 indicates a long-term or wideband component of the PMI and BCI, and W2 indicates a short-term or narrowband component of the PMI and BCI. Here, the other mobile terminal is possibly co-scheduled with the mobile terminal in the wireless communication system.

According to one embodiment of the present disclosure, the receiving unit 1301 further receives a BCI W2 from the mobile terminal, wherein the BCI W1 set is shifted by the mobile terminal based on the PMI W2, and the BCI W2 is selected by the mobile terminal from the shifted BCI W1 set based on the PMI W2. According to one embodiment of the present disclosure, the BCI W1 set is received on a relatively long interval. According to one embodiment of the present disclosure, the BCI W1 set is received on a relatively long interval, and BCI W2 is received on a relatively short interval. According to one embodiment of the present disclosure, the BCI W1 set and the BCI W2 are received both on relatively short interval.

According to one embodiment of the present disclosure, the selection unit 1306 selects the BCI W2 from the BCI W1 set based on the PMI W2. Here, the BCI W2 is preferred to be orthogonal to the PMI W2.

According to one embodiment of the present disclosure, the shifting unit 1307 shifts the BCI W1 set based on the PMI W2. In the present disclosure, the double codebook is a combination of DFT components and co-phasing factors, the DFT components are represented by a plurality of columns of vectors, and the co-phasing factors are represented by [1, −1, j, −j]. According to one embodiment of the present disclosure, the shifting unit 1307 shifts the BCI W1 set to its left side if the PMI W2 is located on the left side column of the PMI W1 set, and shifts the BCI W1 set to its right side if the PMI W2 is located on the right side column of the PMI W1 set. Further, the shifting unit 1307 can shift the BCI W1 set by one or two columns of the vectors. According to one embodiment of the present disclosure, the shifting unit 1307 further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit confines the co-phasing factors of the BCI W1 set to [j, −j].

According to one embodiment of the present disclosure, the shifting unit 1307 is installed in the base station, and the shifting unit 405 can be configured with the same schema of how to shift the BCI W1 set and confine the co-phasing factors in advance. In such a way, when the mobile terminal reports the BCI W1 set to the base station, both of the base station and the mobile terminal will know how to shift the BCI W1 set and confine the co-phasing factors, so can select the BCI W2 from the shifted BCI W1 set with the same schema consistently between the base station and the mobile terminal. However, according to another embodiment of the present disclosure, the shifting unit 1307 may not be installed in the base station. In such a way, when the mobile terminal reports the BCI W1 set to the base station, the mobile terminal will additionally report to the base station how the BCI W1 set is shifted compared with original BCI W1 set. In this case, the base station receiving unit not only receives PMI W1, PMI W2, BCI W1, BCI W2, but also receives the addition signaling regarding the shifting/confining schema. In both cases (shifting unit is installed or not), it is commonly understood between the mobile terminal and the base station that the reported BCI W2 is selected from the shifted/confined BCI W1 set but not the original BCI W1 set. Thus, the base station can receive the signaling to get the preferred BCI W2, and potentially pre-code the data of the co-scheduled mobile terminal with the preferred BCI W2.

According to one embodiment of the present disclosure, in the FIG. 1, the mobile terminal 101 included in the wireless communication system 100 can be realized as the mobile terminal 400 according to the present disclosure, wherein the mobile terminal 400 comprises: an obtaining unit 401 which obtains a PMI W1 set and a PMI W2 set based on a double codebook, a computation unit 402 which computes a BCI W1 set to be used for another mobile terminal based on the PMI W1 set, a selection unit 403 which selects a BCI W2 from the BCI W1 set based on the PMI W2, and a reporting unit 404 which reports the BCI W1 set and the BCI W2 to the base station. Here, W1 indicates a long-term or wideband component of the PMI and BCI, and W2 indicates a short-term or narrowband component of the PMI and BCI. The other mobile terminal is possibly co-scheduled with the mobile terminal in the wireless communication system.

Further, the mobile terminal 400 included in the wireless communication system 100 can further comprise a shifting unit 405 which shifts the BCI W1 set based on the PMI W2. Specifically, the reporting unit 404 reports the BCI W1 set on a long time interval, and reports the BCI W2 on a short time interval. The double codebook is a combination of DFT components and co-phasing factors, the DFT components are represented by a plurality of columns of vectors, the co-phasing factors are represented by [1, −1, j, −j]. The shifting unit 405 shifts the BCI W1 set to its left side if the PMI W2 is located on the left side column of the PMI W1 set, and shifts the BCI W1 set to its right side if the PMI W2 is located on the right side column of the PMI W1 set. The shifting unit 405 may shift the BCI W1 set by one or two columns of the vectors. The shifting unit 405 further confines the co-phasing factors of the BCI W1 set, wherein if the PMI W2 has co-phasing factors within [1, −1], the shifting unit confines the co-phasing factors of the BCI W1 set to [1, −1], and if the PMI W2 has co-phasing factors within [j, −j], the shifting unit 405 confines the co-phasing factors of the BCI W1 set to [j, −j]. The BCI W2 selected from the BCI W1 set is orthogonal to the PMI W2.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of reporting BCI (best companion PMI (pre-coding matrix index)) in a wireless communication system, comprising the steps of:
    obtaining a PMI W1 set and a PMI W2 to be used for a mobile terminal based on a double codebook;
    computing a BCI W1 set to be used for another mobile terminal based on the PMI W1 set;
    reporting the BCI W1 set to a base station, wherein, W1 indicates a long-term or wideband component of the PMI and BCI, and W2 indicates a short-term or narrowband component of the PMI and BCI;
    selecting a BCI W2 from the BCI W1 set based on the PMI W2;
    reporting the BCI W2 to the base station; and
    shifting the BCI W1 set based on the PMI W2.

2. The method of reporting BCI according to claim 1, wherein the double codebook is a combination of Discrete Fourier Transform (DFT) components and co-phasing factors, the DFT components are represented by a plurality of columns of vectors, and the co-phasing factors are represented by $[1, -1, j, -j]$.

3. The method of reporting BCI according to claim 2, wherein if the PMI W2 is located on the left side column of the PMI W1 set, shifting the BCI W1 set to its left side, and if the PMI W2 is located on the right side column of the PMI W1 set, shifting the BCI W1 set to its right side.

4. The method of reporting BCI according to claim 3, further comprising a step of: shifting the BCI W1 set by one or two columns of the vectors.

5. The method of reporting BCI according to claim 3, further comprising a step of:
    confining the co-phasing factors of the BCI W1 set,
    wherein, if the PMI W2 having co-phasing factors within $[1, -1]$, confining the co-phasing factors of the BCI W1 set to $[1, -1]$, and if the PMI W2 having co-phasing factors within $[j, -j]$, confining the co-phasing factors of the BCI W1 set to $[j, -j]$.

6. The method of reporting BCI according to claim 1, wherein the BCI W2 is orthogonal to the PMI W2.

7. The method of reporting BCI according to claim 1, wherein the other mobile terminal is possibly co-scheduled with the mobile terminal in the wireless communication system.

8. A mobile terminal for reporting BCI (best companion PMI (pre-coding matrix index)) to a base station in a wireless communication system, comprising one or more integrated circuits configured to:
    obtain a PMI W1 set and a PMI W2 to be used for the mobile terminal based on a double codebook;
    compute a BCI W1 set to be used for another mobile terminal based on the PMI W1 set; and
    report the BCI W1 set to a base station, wherein, W1 indicating a long-term or wideband component of the PMI and BCI, and W2 indicating a short-term or narrowband component of the PMI and BCI;
    select a BCI W2 from the BCI W1 set based on the PMI W2, and the reporting unit reports the BCI W2 to the base station, and
    shift the BCI W1 set based on the PMI W2.

9. The mobile terminal according to claim 8, wherein the double codebook is a combination of Discrete Fourier Transform (DFT) components and co-phasing factors, the DFT components are represented by a plurality of columns of vectors, and the co-phasing factors are represented by $[1, -1, j, -j]$.

10. A mobile terminal for reporting BCI (best companion PMI (pre-coding matrix index)) to a base station in a wireless communication system, comprising one or more integrated circuits configured to:
    obtain a PMI W1 set and a PMI W2 to be used for the mobile terminal based on a double codebook;
    compute a BCI W1 set to be used for another mobile terminal based on the PMI W1 set; and
    report the BCI W1 set to a base station, wherein, W1 indicating a long-term or wideband component of the PMI and BCI, and W2 indicating a short-term or narrowband component of the PMI and BCI;
    select a BCI W2 from the BCI W1 set based on the PMI W2, and report the BCI W2 to the base station,
    wherein the double codebook is a combination of Discrete Fourier Transform (DFT) components and co-phasing factors, the DFT components are represented by a plurality of columns of vectors, and the co-phasing factors are represented by $[1, -1, j, -j]$, and
    wherein the BCI W1 set is shifted to its left side if the PMI W2 is located on the left side column of the PMI W1 set, and the BCI W1 set is shifted to its right side if the PMI W2 is located on the right side column of the PMI W1 set.

11. The mobile terminal according to claim 10, wherein the BCI W1 set is shifted by one or two columns of the vectors.

12. The mobile terminal according to claim 10, wherein the co-phasing factors of the BCI W1 set are further confined, wherein if the PMI W2 has co-phasing factors within $[1, -1]$, the co-phasing factors of the BCI W1 set are confined, to $[1, -1]$, and if the PMI W2 has co-phasing factors within $[j, -j]$, the co-phasing factors of the BCI W1 set are confined to $[j, -j]$.

13. A base station for receiving BCI (best companion PMI (pre-coding matrix index)) from a mobile terminal in a wireless communication system, comprising one or more integrated circuits configured to:
    receive a PMI W1 set, a PMI W2, and a BCI W1 set from the mobile terminal, which are generated based on a double codebook;
    pre-code data to be sent to another mobile terminal with the BCI W1 set,
    wherein, W1 indicating a long-term or wideband component of the PMI and BCI, and W2 indicating a short-term or narrowband component of the PMI and BCI,
    wherein a BCI W2 is further received from the mobile terminal, and
    wherein the BCI W1 set is shifted by the mobile terminal based on the PMI W2, and the BCI W2 is selected by the mobile terminal from the shifted BCI W1 set based on the PMI W2.

14. The base station according to claim 13, wherein the BCI W1 set is received on a relatively long interval.

15. The base station according to claim 13, wherein the BCI W1 set is received on a relatively long interval, and BCI W2 is received on a relatively short interval.

16. The base station according to claim 13, wherein the BCI W1 set and the BCI W2 are received both on relatively short interval.

17. The base station according to claim 13, wherein the BCI W2 from the BCI W1 set based on the PMI W2.

18. The base station according to claim 17, wherein the BCI W2 is orthogonal to the PMI W2.

19. The base station according to claim 13, further comprising a shifting unit which shifts the BCI W1 set based on the PMI W2.

20. The base station according to claim 19, wherein the double codebook is a combination of Discrete Fourier Transform (DFT) components and co-phasing factors, the DFT components are represented by a plurality of columns of vectors, and the co-phasing factors are represented by [1, −1, j, −j].

21. The base station according to claim 20, wherein the BCI W1 set is shifted to its left side if the PMI W2 is located on the left side column of the PMI W1 set, and the BCI W1 set is shifted to its right side if the PMI W2 is located on the right side column of the PMI W1 set.

22. The base station according to claim 21, wherein the shifting unit shifts the BCI W1 set by one or two columns of the vectors.

23. The base station according to claim 22, wherein the co-phasing factors of the BCI W1 set are further confined, wherein if the PMI W2 has co-phasing factors within [1, −1], the co-phasing factors of the BCI W1 set are confined to [1, −1], and if the PMI W2 has co-phasing factors within [j, −j], the co-phasing factors of the BCI W1 set are confined to [j, −j].

24. The base station according to claim 13, wherein the other mobile terminal is possibly co-scheduled with the mobile terminal in the wireless communication system.

* * * * *